(12) United States Patent
Yuzaki et al.

(10) Patent No.: US 7,441,535 B2
(45) Date of Patent: Oct. 28, 2008

(54) SHAPE OF COMBUSTION CHAMBER FOR DIRECT-INJECTION DIESEL ENGINE

(75) Inventors: Keiichiro Yuzaki, Osaka (JP); Hiroyuki Fujii, Osaka (JP)

(73) Assignee: Yanmar Co., Ltd., Osaka-shi (JP)

( * ) Notice: Subject to any disclaimer, the term of this patent is extended or adjusted under 35 U.S.C. 154(b) by 0 days.

(21) Appl. No.: 11/663,848

(22) PCT Filed: Sep. 29, 2005

(86) PCT No.: PCT/JP2005/017996

§ 371 (c)(1),
(2), (4) Date: Mar. 27, 2007

(87) PCT Pub. No.: WO2006/040936

PCT Pub. Date: Apr. 20, 2006

(65) Prior Publication Data

US 2007/0199538 A1 Aug. 30, 2007

(30) Foreign Application Priority Data

Oct. 14, 2004 (JP) .............................. 2004-300355

(51) Int. Cl.
*F02F 3/26* (2006.01)
(52) U.S. Cl. .................... 123/276; 123/193.6; 123/279; 123/299; 123/300
(58) Field of Classification Search .............. 123/48 D, 123/193.6, 276, 279, 299, 300
See application file for complete search history.

(56) References Cited

U.S. PATENT DOCUMENTS 3,814,068 A * 6/1974 Kimbara et al. ............. 123/261
4,221,190 A * 9/1980 Komiyama et al. ......... 123/263
4,838,222 A * 6/1989 Yanagisawa et al. ........ 123/263
6,955,165 B2 * 10/2005 Liu ............................. 123/663

FOREIGN PATENT DOCUMENTS

JP 2-233822 A 9/1990
JP 3-106127 U 11/1991

(Continued)

OTHER PUBLICATIONS

International Search Report dated Dec. 6, 2005 including English translation of pertinent portion (Five(5) pages).

*Primary Examiner*—Stephen K. Cronin
*Assistant Examiner*—J. Page Hufty
(74) *Attorney, Agent, or Firm*—Crowell & Moring LLP (57) ABSTRACT

The invention relates to a shape of a combustion chamber for a direct-injection diesel engine, in which a mixture in, particularly, an expansion stroke is promoted by optimally designing the shape of the combustion chamber, and further, the compatibility between PM reduction and NOx reduction can be achieved by improving a retardation limit and speeding up combustion at a high EGR. The inside of a combustion chamber 12 formed at a top of a piston is formed in such a manner that a vertically cross-sectional shape passing a center axis O2 inside of the combustion chamber is symmetric with respect to the center axis. Furthermore, an opening 18 at an upper end of the combustion chamber 12 is formed into a substantially polygonal shape in combination of round portions 21 and straight portions 22.

5 Claims, 6 Drawing Sheets

FOREIGN PATENT DOCUMENTS

| | | |
|---|---|---|
| JP | 4-116631 U | 10/1992 |
| JP | 5-106443 A | 4/1993 |
| JP | 6-193448 A | 7/1994 |
| JP | 6-221162 A | 8/1994 |
| JP | 6-346736 A | 12/1994 |
| JP | 7-150944 A | 6/1995 |
| JP | 8-135449 A | 5/1996 |
| JP | 2000-352316 A | 12/2000 |
| JP | 2001-221050 A | 8/2001 |
| JP | 2002-285850 A | 10/2002 |

* cited by examiner

SHAPE OF COMBUSTION CHAMBER FOR DIRECT-INJECTION DIESEL ENGINE

TECHNICAL FIELD

The present invention relates to a shape of a combustion chamber for a direct-injection diesel engine.

BACKGROUND ART

In a diesel engine of this type, a severe emission control has been imposed year to year in accordance with a recently increased attention to environmental issues. In particular, NOx and a particulate matter (hereinafter abbreviated as "PM") among harmful substances contained in exhaust gas have been required to be reduced.

However, NOx is liable to be generated in a complete combustion state: in contrast, the PM is liable to be generated in an incomplete combustion state. Therefore, NOx and the PM have the relationship of a trade-off: namely, one is decreased in exhaust amount while the other is increased in exhaust amount. As a consequence, the simultaneous reduction of the exhaust amount of both of NOx and PM is an important problem to be solved in the field of the diesel engine.

Examples of means conventionally adopted to reduce NOx include an EGR (abbreviating an exhaust gas recirculation) for circulating a part of exhaust gas in an intake system, retardation of a fuel injection timing, and the like. However, only such means induces an increase in PM due to the relationship of the above-described trade-off.

The shape of a combustion chamber formed at an upper portion of a piston is significantly involved in the increase in PM, as described below.

Figure 10:
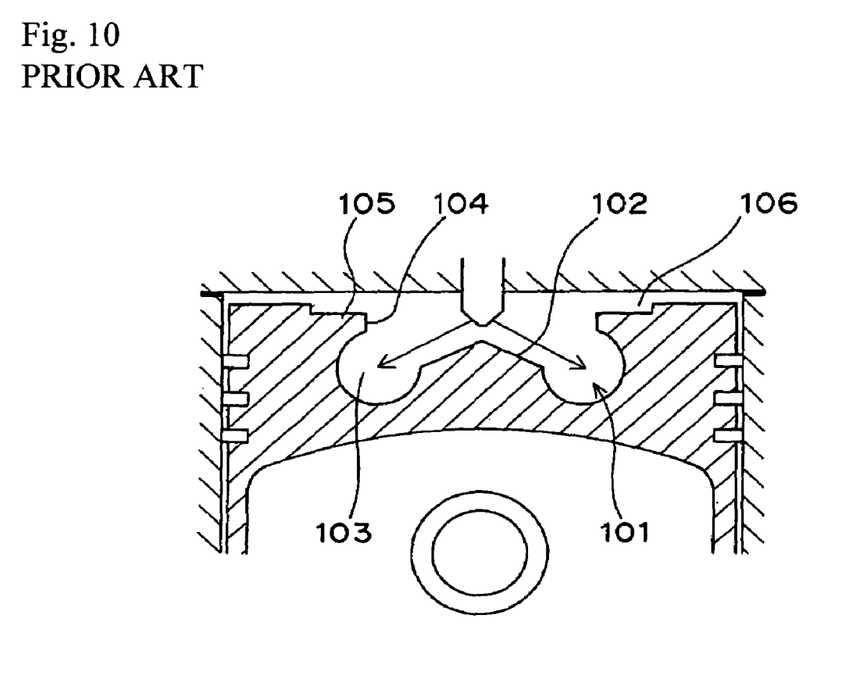
FIG. 10 is a cross-sectional view showing a combustion chamber formed at a top of a piston in the prior art.

For example, Patent Literature 1 discloses a direct-injection diesel engine, in which a recessed combustion chamber is formed at an upper portion of a piston. As shown in FIG. 10, a combustion chamber 101 is configured by including a conical center projection 102 at the center of a bottom and forming an annular groove 103 into a substantially arcuate shape, as viewed in cross section, around the center projection 102. An opening 104 of the combustion chamber 101 is formed into a circular shape. A lip 105 protruding toward an inner circumference in such a manner as to narrow an opening area is formed is formed at the opening 104. Fuel is radially injected toward the inside of the combustion chamber 101, to be then mixed with air in the combustion chamber 101, followed by combustion.

A flame or a mixture air generated in the combustion chamber 101 flows from the combustion chamber 101 to a main chamber 106 in an expansion stroke. At this time, if the opening of the combustion chamber is formed into the circular shape, the flame or the mixture air uniformly flows in a circumferential direction, thereby weakening the flow of the flame or the mixture air from the combustion chamber 101 to the main chamber 106. Moreover, the fuel injected from a fuel injection nozzle is allowed to swirl inside of the combustion chamber 101 in the circumferential direction while being mixed with the air in the combustion chamber 101. Here, since the flow outside of the combustion chamber 101 is weak in the expansion stroke, the flame or the not-burnt mixture air flows inside of the combustion chamber 101 in the circumferential direction, thereby prolonging a staying time inside of the combustion chamber 101. As a consequence, the mixture of the fuel and the air cannot be promoted in, particularly, the main chamber 106, and therefore, combustion in a late period cannot be properly performed.

Under the above-described circumstances, even if the fuel injection timing is retarded for the purpose of NOx reduction, a retardation limit cannot be extended since there is a high possibility of an increase in amount of black smoke due to the incomplete combustion. Furthermore, an air utilization rate becomes low even at a high EGR rate, and therefore, a combustion speed becomes low, resulting in the increase in amount of black smoke.

Prior art literature is exemplified by Japanese Patent Application Laid-open (JP-A) No. 2001-221050.

DISCLOSURE OF INVENTION

The present invention has been accomplished to solve the above-described problems experienced in the prior art. Therefore, an object of the present invention is to provide a shape of a combustion chamber for a direct-injection diesel engine, in which a mixture in, particularly, an expansion stroke is promoted by optimally designing the shape of the combustion chamber, and further, the compatibility between PM reduction and NOx reduction can be achieved by improving a retardation limit and speeding up combustion at a high EGR.

SUMMARY OF THE INVENTION

According to a first aspect of the present invention, in a shape of a combustion chamber for a direct-injection diesel engine, in which a recessed combustion chamber is formed at a top of a piston, fuel is injected into the combustion chamber, and further, a mixture air of the fuel and air is allowed to be burnt, the inside of the combustion chamber is formed into substantially a shape of a rotating body on an axis in a piston slide direction, and an opening at an upper end of the combustion chamber is formed into a substantially polygonal shape in combination of round portions and straight portions.

According to a second aspect of the present invention, in the above shape of a combustion chamber for a direct-injection diesel engine defined in the first aspect 1, the opening at the upper end of the combustion chamber is formed into a substantially regular hexagonal shape.

According to a third aspect of the present invention, in the above shape of the combustion chamber for the direct-injection diesel engine defined in the first aspect, the center axis of the inside of the combustion chamber is aligned with the center axis of the opening at the upper end.

According to a fourth aspect of the present invention, in the above shape of the combustion chamber for the direct-injection diesel engine defined in the first aspect, a radius R of the round portion at the opening at the upper end of the combustion chamber and a diameter D of the piston satisfy the relationship: $0.04 < R/D < 0.12$.

According to a fifth aspect of the present invention, in the above shape of the combustion chamber for the direct-injection diesel engine defined in the first aspect, an inside wall of the combustion chamber includes: an upper circumferential wall extending downward from an upper surface of the piston at an angle a; an intermediate circumferential wall extending downward outside in a radial direction from a lower end of the upper circumferential wall at an angle b with respect to the upper surface of the piston; and a lower circumferential wall extending downward outside in the radial direction from the lower end of the intermediate circumferential wall at an angle c with respect to the upper surface of the piston; wherein the angles are set, respectively, as follows: $a=90°$; $65°<b<75°$; and $40°<c<55°$.

According to a sixth aspect of the present invention, in the above shape of the combustion chamber for the direct-injection diesel engine defined in the fifth aspect, the entire depth H of the combustion chamber and a depth h' from a boundary between the intermediate circumferential wall and the lower circumferential wall to a bottom end of the combustion chamber satisfy the relationship: $0.65<h'/H<0.75$ according to the fifth aspect of the invention.

According to a seventh aspect of the present invention, in the above shape of the combustion chamber for the direct-injection diesel engine defined in the first aspect, a distance L between the straight portions facing each other at the opening at the upper end of the combustion chamber, a maximum diameter d' of the combustion chamber, and the diameter D of the piston satisfy the relationships: $0.4<L/D<0.55$ and $0.05<(d'-L)/D$.

According to an eighth aspect of the invention, in the above shape of the combustion chamber for the direct-injection diesel engine defined in the first aspect, a center projection is formed at the center of the bottom of the combustion chamber, and further, and an expanding portion expanding outward in the radial direction is formed at an outer peripheral portion between an outer peripheral edge on a top wall of the center projection and a foot of the center projection.

ADVANTAGES OF THE INVENTION

According to the first aspect of the present invention, a flame or a mixture air staying inside of the combustion chamber can be allowed to strongly flow into a main chamber from mainly each of the round portions at the polygonal opening in an expansion stroke, thereby promoting the mixture of the air and the fuel in the main chamber. As a consequence, an air utilization rate can be increased in the expansion stroke, and further, a combustion speed can be increased. Thus, even if measures for reducing NOx are taken, for example, an injection timing is retarded or an EGR rate is increased, a PM can be reduced. In other words, it is possible to reduce NOx and the PM at the same time. In addition, even if an injector of a relatively low injection pressure is used, the PM can be reduced.

According to the second aspect of the present invention, the angle of the round portion at the opening of the combustion chamber, that is, an angle relative to an adjacent straight portion becomes optimum, thereby favorably forming a strong flow from mainly the round portion in the expansion stroke.

According to the third aspect of the present invention, the flame or the mixture air flowing from the combustion chamber into the main chamber uniformly flows from each of the round portions at the opening. As a consequence, the air utilization rate in the main chamber can be increased, and further, the mixture can be promoted.

According to the fourth aspect of the present invention, the angle of the round portion at the opening of the combustion chamber becomes optimum, thereby favorably forming a strong flow from mainly the round portion in the expansion stroke.

According to the fifth aspect of the present invention, the shape of the circumferential wall of the combustion chamber can allow a swirl flow to be held inside of the combustion chamber, and further, the strong flow to be injected from mainly the round portion in the expansion stroke. In particular, a strong flow disturbance is generated in the vicinity of the boundary between the intermediate circumferential wall and the lower circumferential wall, thereby producing a strong reverse squish flow to the main chamber. Thus, it is possible to more promote the mixture in the main chamber.

According to the sixth aspect of the present invention, the boundary position between the intermediate circumferential wall and the lower circumferential wall is properly set, thereby favorably holding the swirl flow inside of the combustion chamber and producing the strong reverse squish flow in the expansion stroke.

According to the seventh aspect of the present invention, an opening ratio (L/D) of the opening of the combustion chamber to the diameter of the piston and a ratio ((d'-L)/D) of an overhang quantity at the opening with respect to a maximum diameter of the combustion chamber to the diameter of the piston are properly set, thereby holding the swirl flow inside of the combustion chamber, and obtaining the strong reverse squish flow and the strong flow from each of the round portions at the opening in the expansion stroke.

According to the eighth aspect of the present invention, an expanding portion can introduce the mixture air from the bottom of the combustion chamber to a stronger flow region at the upper portion of the combustion chamber, thereby promoting the mixture.

Here, according to the first to fourth and eighth aspects, mainly graphite of the PM can be reduced: in contrast, according to the fifth to seventh aspects, hydrocarbon can be additionally reduced.

BEST MODE FOR CARRYING OUT THE INVENTION

[Shape of Combustion Chamber]

Figure 1:
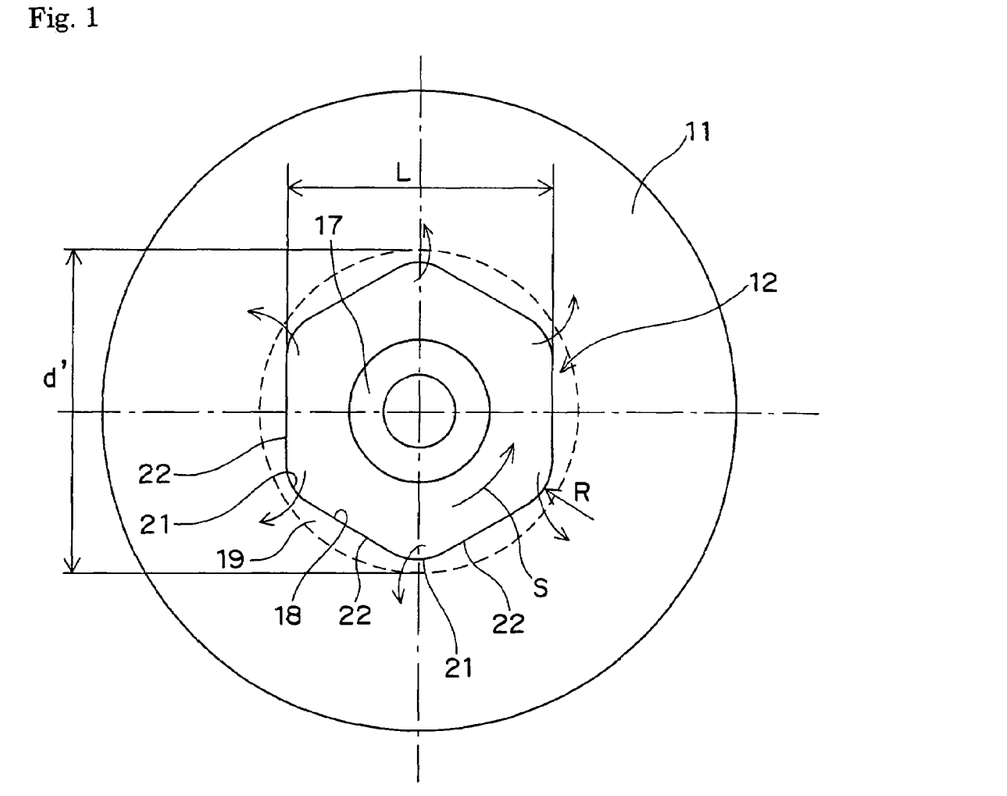
FIG. 1 is a plan view showing a top of a piston in a direct-injection diesel engine, to which the invention is applied.
Figure 2:
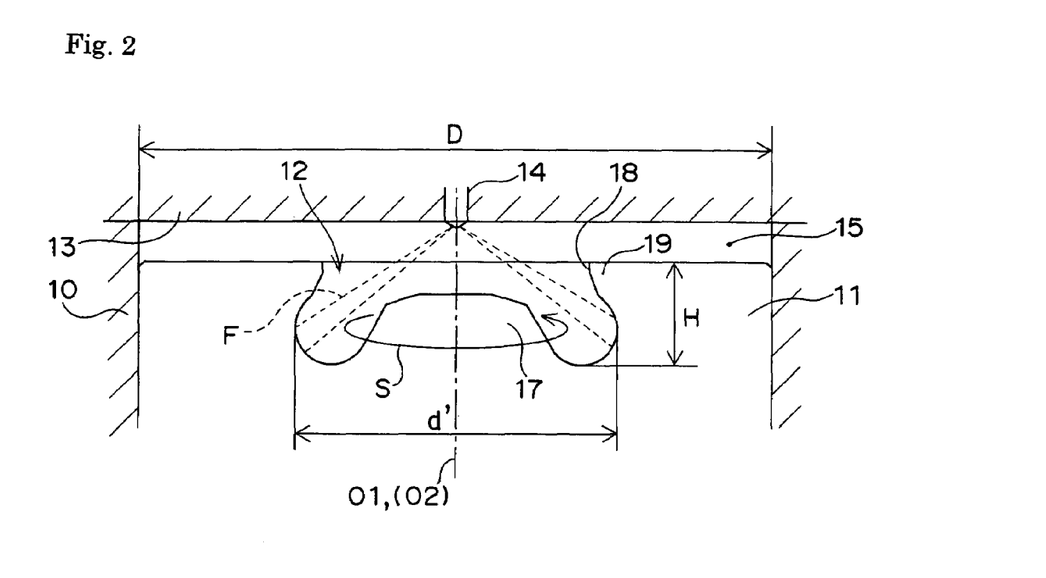
FIG. 2 is a cross-sectional view showing a combustion chamber at the top of the piston.

FIG. 1 is a plan view showing a top of a piston in a direct-injection diesel engine, to which the present invention is applied; and FIG. 2 is a cross-sectional view showing a combustion chamber at the top of the piston. As shown in FIGS. 1 and 2, a piston 11 is fitted into a cylinder liner 10 in a cylinder block, a recessed combustion chamber 12 (i.e., a cavity) is formed at a top of the piston 11, and an upper portion of the combustion chamber 12 is closed with a lower surface of a cylinder head 13. A fuel injection valve 14 whose center of an injection port is located on a cylinder center line (i.e., a piston center axis) O1 is fixed to the cylinder head 13. As a consequence, the fuel injection valve 14 is adapted to conically inject fuel toward the inside of the combustion chamber 12. The fuel injected into the combustion chamber 12 is mixed with intake air inside of the combustion chamber 12, and then, the resultant mixture air is burnt inside of the combustion chamber 12.

In the combustion chamber 12, a substantially truncated conical center projection 17 is formed at the center of a bottom. Around the center projection 17 is formed an annular groove. A lip 19 protrudes at an opening 18 at an upper end of the combustion chamber 12 in such a manner as to reduce the area of the opening 18. The inside (i.e., the inside shape) of the combustion chamber 12 is formed into a shape of a rotating body on an axis O2 in alignment with the piston center axis O1, and the vertically cross-sectional shape of the combustion chamber 12 passing the axis O2 is symmetric with respect to the axis.

As shown in FIG. 1, the opening 18 of the combustion chamber 12 is formed into a substantially polygonal shape in combination of round portions 21 and straight portions 22. The opening 18 in the present embodiment is formed into a substantially regular hexagonal shape in combination of six round portions 21 and six straight portions 22 in a size enough to range within a maximum diameter d' of the combustion chamber 12. The center axis of the opening 18 accords with the center axis O2 inside of the combustion chamber.

A radius R of the round portion 21 and a diameter D of the piston 11 are designed to satisfy the relationship: 0.04<R/D<0.12. Moreover, a distance L between the straight portions 22 facing each other at the opening 18 and the diameter D of the piston 11 are designed to satisfy the relationship: 0.4<L/D<0.55. Furthermore, the maximum diameter d' of the combustion chamber 12, the distance L and the diameter D of the piston 11 are designed to satisfy the relationship: 0.05<(d'−L)/D.

Figure 3:
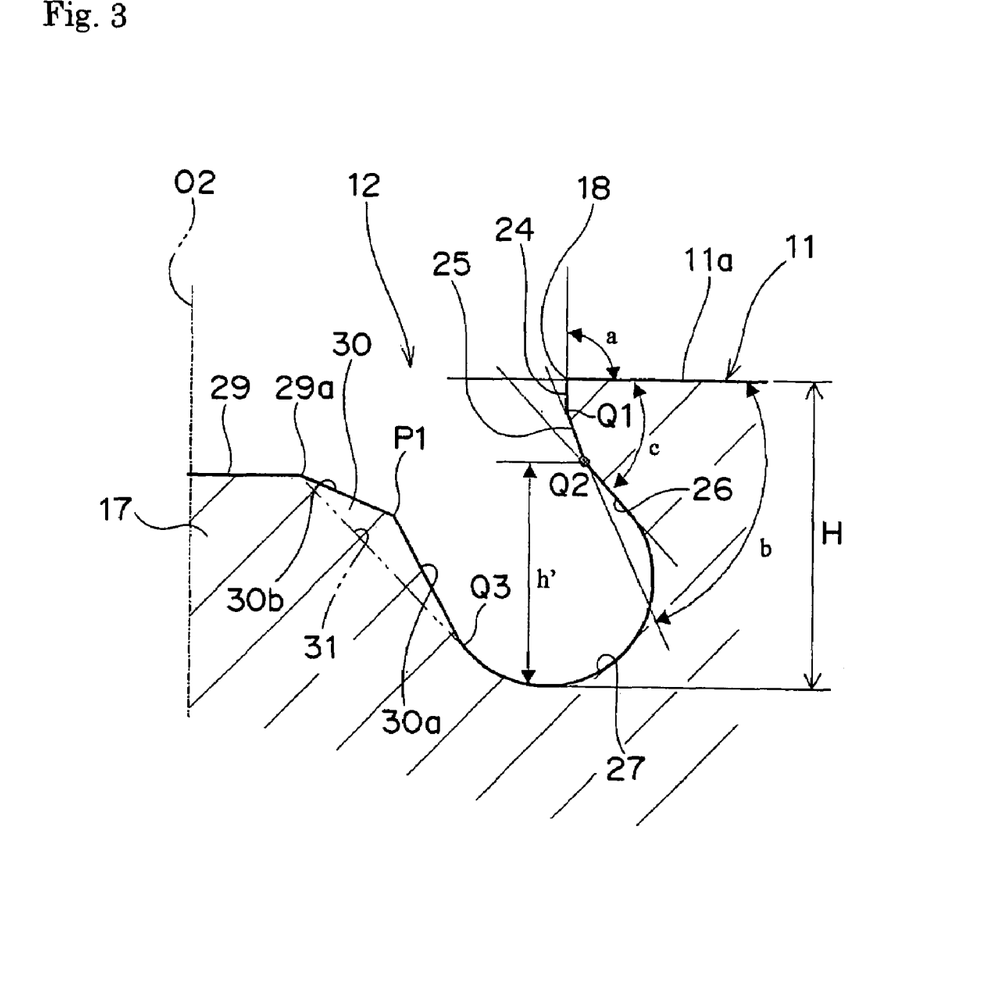
FIG. 3 is a vertically cross-sectional view showing the half of the combustion chamber in enlargement.

FIG. 3 is a vertically cross-sectional view showing the half of the combustion chamber 12 in enlargement. The inner surface of the combustion chamber 12 consists of circumferential walls 24 to 27, and circumferential walls 30a and 30b and a top wall 29 of the center projection 17. The circumferential walls 24 to 27 specifically signify an upper circumferential wall 24 extending straight downward from a top surface 11a of the piston 11 at an angle a, an intermediate circumferential wall 25 extending straight downward outside in a radial direction from the lower end of the upper circumferential wall 24 at an angle b with respect to the top surface 11a of the piston, a lower circumferential wall 26 extending straight downward outside in the radial direction from the lower end of the intermediate circumferential wall 25 at an angle c with respect to the top surface 11a of the piston, and a recessed arcuate bottom circumferential wall 27 extending from the lower end of the lower circumferential wall 26 toward the bottom of the combustion chamber 12 continuously to the circumferential wall 30a of the center projection 17.

The aforementioned angles a, b and c are set, respectively, as follows: a=90°; 65°<b<75°; and 40°<c<55°. A boundary Q1 between the upper circumferential wall 24 and the intermediate circumferential wall 25 and another boundary Q2 between the intermediate circumferential wall 25 and the lower circumferential wall 26 are bent. In contrast, the lower circumferential wall 26 is smoothly continued to the bottom circumferential wall 27, and further, the bottom circumferential wall 27 is smoothly continued to the circumferential wall 30a of the center projection.

With respect to the entire depth H of the combustion chamber 12, a depth h' from the boundary Q2 between the intermediate circumferential wall 25 and the lower circumferential wall 26 to the bottom of the combustion chamber 12 is designed to satisfy the relationship: 0.65<h'/H<0.75.

The top wall 29 of the center projection 17 is formed into a flat surface perpendicular to the axis O2. An expanding portion 30 expanding outside in the radial direction is formed between an outer peripheral edge 29a of the top wall 29 and a radial inner end of the bottom circumferential wall 27 (i.e., a foot end of the center projection 17) Q3. The expanding portion 30 is expanded in a triangular shape from an outer peripheral wall (indicated by a virtual line) 31 which connects the bottom circumferential wall 27 and the outer peripheral edge 29a of the top wall 29 of the center projection to each other. A vertex P1 is located below the top wall 29. The wall 30a extending from the vertex P1 toward the bottom circumferential wall 27 and the wall 30b extending from the vertex P1 toward the outer peripheral edge 29a of the top wall 29 of the center projection are straight, wherein the wall 30b is shorter than the wall 30a. An expansion quantity of the expanding portion 30 is designed such that fuel F (see FIG. 2) to be injected from the fuel injection valve 14 cannot directly abut against the expanding portion 30.

Incidentally, the expanding portion 30 is formed over the entire height of the center projection 17, so that the outer surfaces 30a and 30b substantially constitute the outer peripheral wall of the center projection 17. In addition, as shown in FIG. 3, a space defined by wall surfaces between the center projection 17 of the combustion chamber 12 and the circumferential walls 24 to 26 is slightly narrowed between the vertex P1 of the expanding portion 30 and the boundary Q1, to be then widened downward and upward.

[Functions and Effects Attributable to Shape of Opening of Combustion Chamber]

(1) As shown in FIG. 1, the opening 18 of the combustion chamber 12 is formed into the regular hexagonal shape. As a consequence, the flame or the mixture air generated inside of the combustion chamber 12 is adapted to be intensively injected into a main chamber (i.e., a space defined between the piston top surface 11a and the cylinder head lower surface 13) 15 from the round portions 21 of the opening 18. Therefore, a strong flow can be produced at each of the round portions 21 and a local flow is liable to be disturbed in comparison with the case of a circular opening 18. Thus, the mixture can be promoted in the main chamber 15 in an expansion stroke, thereby increasing a combustion speed. As a result, it is possible to improve combustion in a late period, so as to reduce the PM and, in particular, reduce the concentration of smoke and soot.

Figure 6:
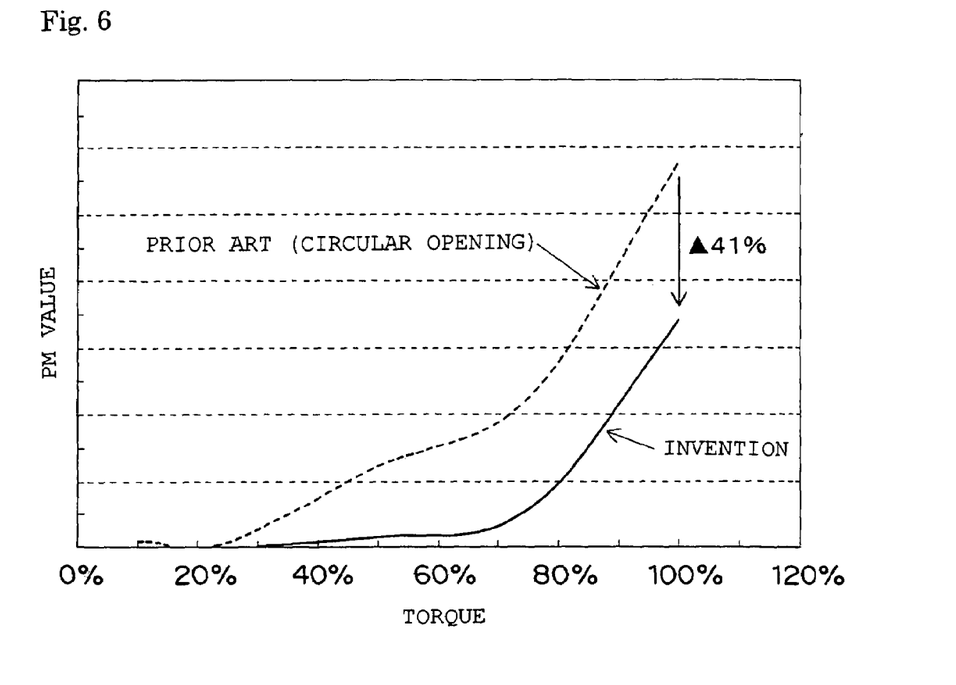
FIG. 6 is a graph illustrating the relationship between a generated torque and a PM value according to the invention and the prior art (in which an opening is formed into a circular shape).

FIG. 6 is a graph illustrating the relationship between a load torque and a PM value according to the present invention (embodiment) and the prior art (in which an opening is formed into a circular shape). In the present embodiment in comparison with the prior art, it has been found that the PM value can be remarkably reduced at, in particular, a high load, and further, that the PM value can be reduced by about 41% of that in the prior art at a torque of 100%.

(2) Since the center axis of the opening 18 of the combustion chamber 12 accords with the center axis O2 of the inside of the combustion chamber 12, the flow from each of the round portions 21 to the main chamber 15 becomes substantially uniform, thereby increasing the utilization rate of the air staying in the main chamber 15, so as to promote the mixture. As a result, the PM can be reduced (that is, the concentration of smoke and soot can be reduced) in the same manner as described above.

Figure 7:
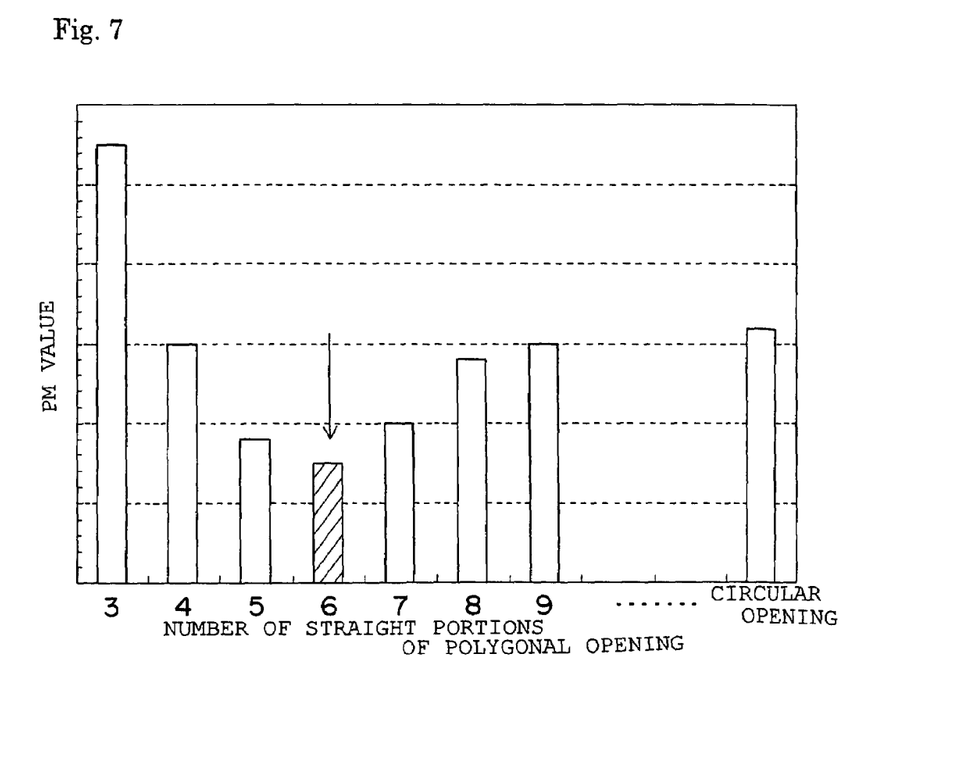
FIG. 7 is a graph illustrating the relationship between the number of straight portions (the number of round portions) at an opening of the combustion chamber and the PM value.

(3) FIG. 7 is a graph illustrating the relationship between the number of straight portions 22 (i.e., the number of round portions 21) at the opening 18 of the combustion chamber and the PM value. As is obvious from the graph illustrated in FIG. 7, the PM value can be most reduced in the case where the opening is formed into a regular hexagonal shape, like in the present embodiment. This is because an angle formed between the adjacent straight portions 22 becomes larger as the number of corners (i.e., round portions 21) of a polygon is increased, thereby weakening the flow of the flame or the mixture air from the combustion chamber 12 toward the main chamber 15, resulting in substantially the same effect as the circular opening in the prior art. In contrast, the angle formed between the adjacent straight portions 22 becomes excessively small as the number of round portions 21 of the polygon is decreased, thereby reducing a passage area of the flame or the like from the combustion chamber 12 toward the main chamber 15 so as to increase the flame or the like remaining inside of the combustion chamber 12, resulting in impossible promotion of the mixture in the main chamber 15.

Figure 8:
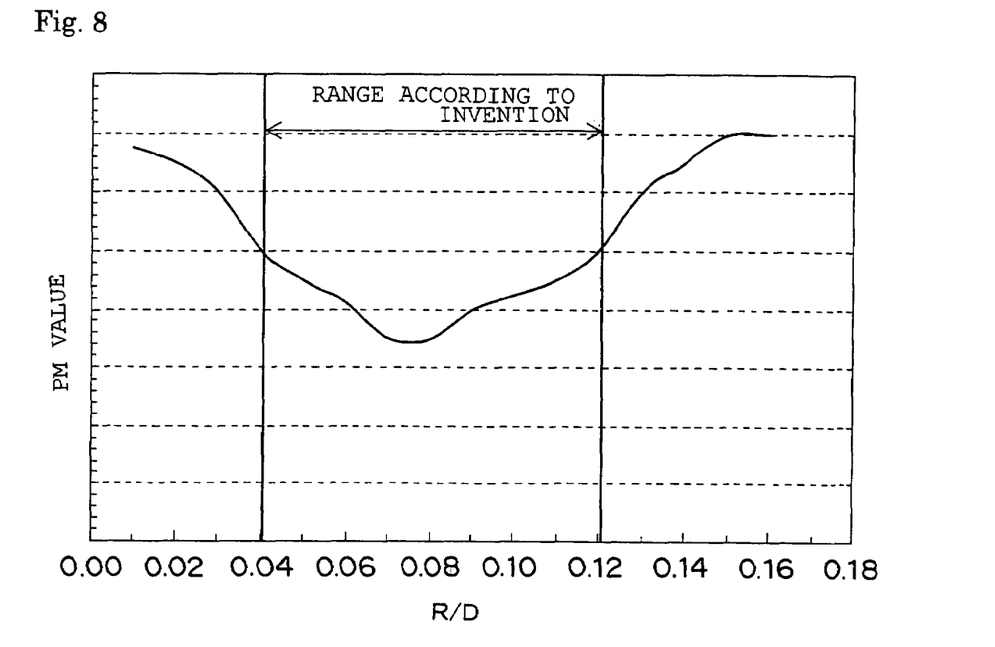
FIG. 8 is a graph illustrating the relationship between an R/D value and the PM value.

(4) FIG. 8 is a graph illustrating the relationship between a ratio (R/D) of the radius R of the round portion 21 of the opening 18 of the combustion chamber to the diameter D of the piston and the PM value. In FIG. 8, if the ratio R/D is smaller than 0.04, in other words, if the radius R of the round portion 21 is relatively smaller than the diameter D of the piston, the passage area of the flame or the mixture air from the combustion chamber 12 toward the main chamber 15 becomes small, thereby increasing the flame or the like remaining inside of the combustion chamber 12, so as to make it impossible to promote the mixture in the main chamber 15. In contrast, if the ratio R/D is larger than 0.12, in other words, if the radius R of the round portion 21 is relatively larger, the flow from the combustion chamber 12 toward the main chamber 15 is diffused also to the straight portions 22, thereby weakening the flow from the round portion 21, so as to make it impossible to promote the mixture. In view of this, the relationship of 0.04<R/D<0.12 is established in the present embodiment. As a consequence, the PM value can be satisfactorily reduced.

Incidentally, in FIG. 8, the PM value can be most reduced when the ratio R/D ranges from about 0.07 to about 0.08.

[Functions and Effects Attributable to Inside Shape of Combustion Chamber]

Figure 4:
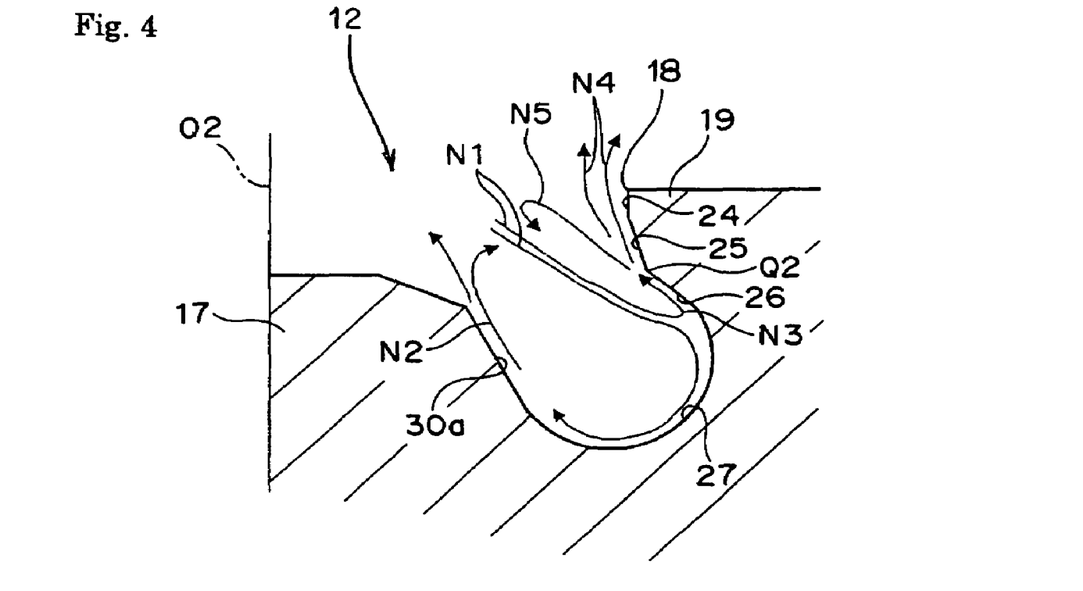
FIG. 4 is a view showing a flow of fuel or mixture air inside of the combustion chamber in a preferred embodiment.
Figure 5:
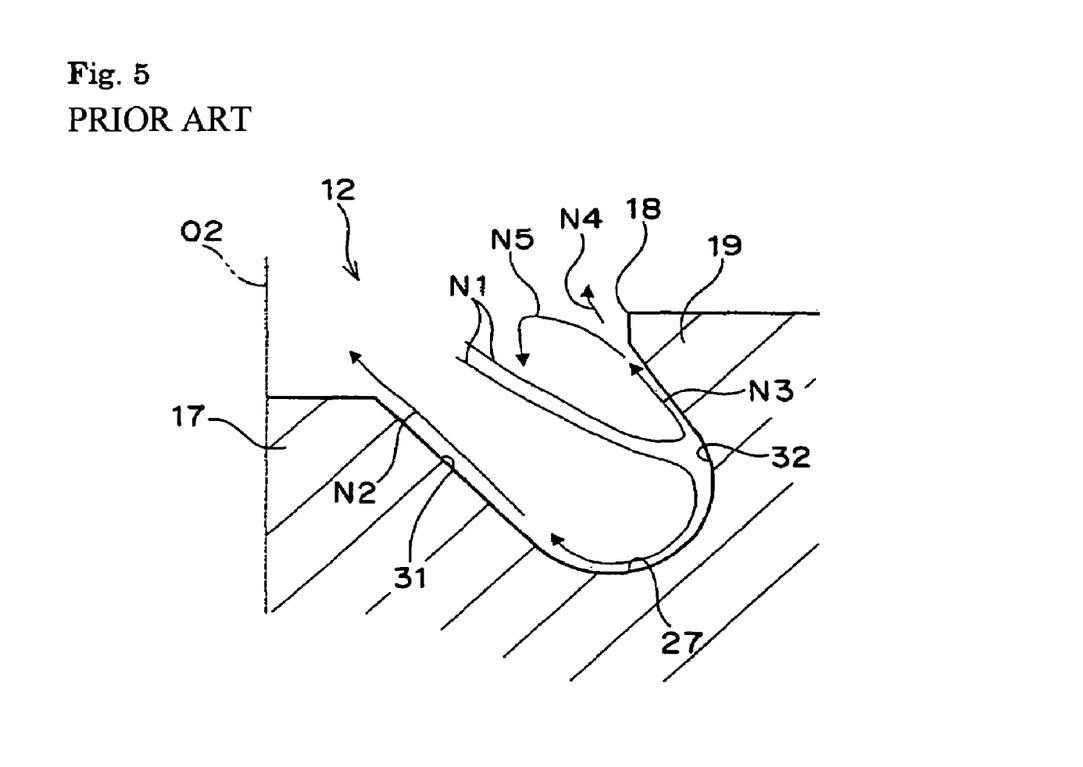
FIG. 5 is a view showing a flow of fuel or mixture air in a comparative example.

(1) FIG. 4 is a view showing the flow of the fuel or the mixture air inside of the combustion chamber in the present embodiment; and FIG. 5 is a view showing the flow of the fuel or the mixture air in a comparative example. In FIG. 5, intermediate and lower circumferential walls are unified into one straight circumferential wall, and further, no expanding portion is formed at the center projection 17.

In the comparative example shown in FIG. 5, the mixture air or the like (N1) flowing into the combustion chamber 12 collides with a circumferential wall 32, and then, is divided into a flow N2 toward the axis O2 along the circumferential wall 31 of the center projection 17 after curves along an arcuate shape of the bottom circumferential wall 27, and a flow N3 upward along the circumferential wall 32 (i.e., the inner surface of the lip 19). Furthermore, the latter flow N3 is divided into a flow N4 beyond the lip 19 as a reverse squish flow and a flow N5 circulating again into the combustion chamber 12.

In contrast, in the present embodiment shown in FIG. 4, as described above, the angles a, b and c shown in FIG. 3 are set, respectively, as follows: a=90°; 65°<b<75°; and 40°<c<55°. The mixture air (N1) flowing into the combustion chamber 12 collides with the circumferential wall (the lower circumferential wall 26 or the bottom circumferential wall 27), and then, is divided into a flow N2 along the circumferential wall 30a of the center projection 17 (i.e., the expanding portion 30) after curves along an arcuate shape of the bottom circumferential wall 27, and a flow N3 along the intermediate circumferential wall 25 and the upper circumferential wall 24 (i.e., a flow along the inner surface of the lip). The flow N2 on the side of the center projection 17 directs upward more than the example shown in FIG. 5 owing to the existence of the expanding portion 30, and then, the flow N2 not only flows toward the axis O2 but also is introduced in an upper region in the combustion chamber 12 on the side of the lip 19, at which the flow is stronger. Consequently, it is possible to promote the mixture in the main chamber 15 in an expansion stroke.

In the meantime, the latter flow N3 is divided into a flow N4 outward of the combustion chamber 12 beyond the lip 19 as a reverse squish flow and a flow N5 circulating again into the combustion chamber 12. Here, the reverse squish flow is more strongly formed since the boundary Q2 between the intermediate circumferential wall 25 and the lower circumferential wall 26 is curved, and further, the flow is liable to be disturbed near a bending point Q.

Thus, it is possible to obtain the strong reverse squish flow in the expansion stroke in the present embodiment, and further, to hold a swirl flow S (see FIG. 2) inside of the combustion chamber 12 and strongly inject the fuel from the round portions 21 of the opening 18 toward the main chamber 15, thereby promoting the mixture in the main chamber 15.

(2) The depth h' from the bending point Q2 to the bottom and the entire depth H of the combustion chamber establish the relationship: 0.65<h'/H<0.75. In this manner, it is possible to hold the swirl flow S, to obtain the strong reverse squish flow in the expansion stroke, as described above, thereby promoting the mixture of the fuel and the air. Here, the bending point Q2 is located above a position, at which the injected fuel arrives.

Figure 9:
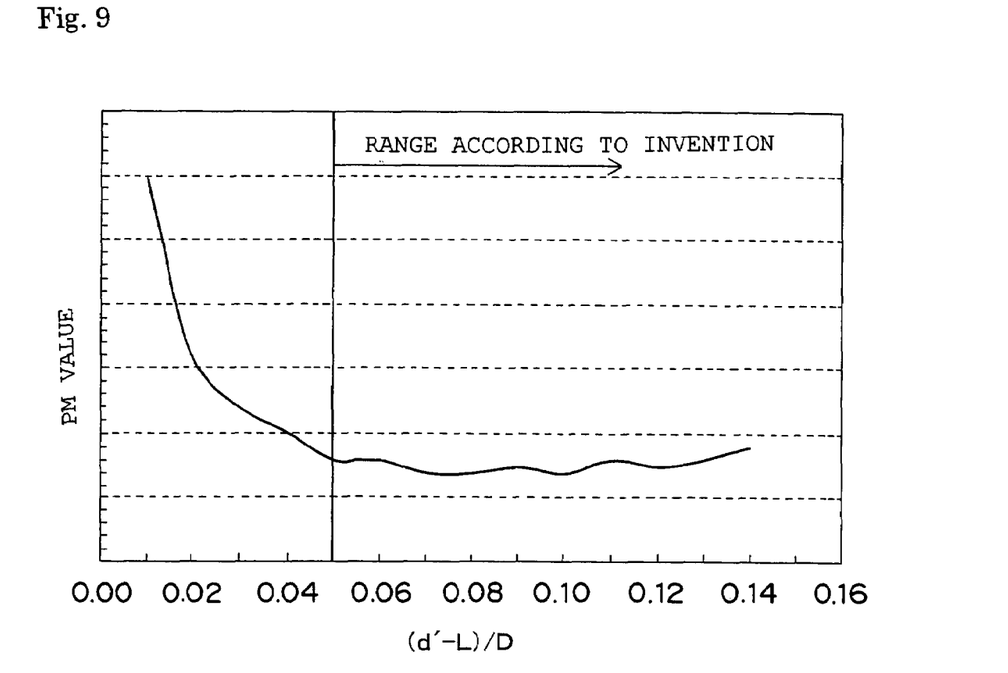
FIG. 9 is a graph illustrating the relationship between a ratio ((d'-L)/D) of a difference of a maximum diameter d' of the combustion chamber from a distance L between the straight portions facing each other, that is, a maximum overhang quantity (d'-L) at a lip to a diameter D of the piston and the PM value.

(3) FIG. 9 is a graph illustrating the relationship between a ratio ((d'−L)/D) of a difference of the maximum diameter d' of the combustion chamber 12 from the distance L between the straight portions 22 facing each other, that is, a maximum overhang quantity (d'−L) at the lip 19 to the diameter D of the piston and the PM value.

In the present embodiment, the ratio ((d'−L)/D) is set to be greater than 0.05, as described above. Therefore, as is obvious from the graph illustrated in FIG. 9, the PM value is satisfactorily reduced. In other words, the strong reverse squish flow can be obtained by setting the maximum overhang quantity above a certain level, and further, the swirl flow can be held inside of the combustion chamber 12. As a consequence, the strong and intensive flow can be injected from each of the round portions 21 of the opening 18 in the expansion stroke, and thus, the mixture can be promoted.

(4) As shown in FIG. 2, since the center projection 17 is formed inside of the combustion chamber 12, a region of an annular groove having a large air flow such as the swirl flow or the squish flow can be enlarged at a predetermined volume of the combustion chamber 12 in comparison with the case of no center projection 17.

OTHER EMBODIMENTS

The present invention is not limited to the above-described embodiment, and can be appropriately modified in design. For example, the center axis of the opening 18 of the combustion chamber 12 may be deviated from the center axis of the inside of the combustion chamber 12. Alternatively, the opening 18 may be formed into a polygonal shape other than the regular hexagonal shape.

The invention claimed is:

1. A combustion chamber for a direct-injection diesel engine, in which the combustion chamber is formed at a top of a piston, fuel is injectable into the combustion chamber, and a mixture of the fuel and air is allowed to be burnt, comprising:
    an inside wall of the combustion chamber being substantially formed to shape a rotating body about an axis of the piston
    an opening at an upper end of the combustion chamber having a substantially regular hexagonal shape;
    wherein the inside wall of the combustion chamber comprises:
        a first wall portion formed as an upper circumferential wall extending downward from an upper surface of the piston at an angle a;
        a second wall portion formed as an intermediate circumferential wall extending downward and radially outward from a lower end of the upper circumferential wall at an angle b with respect to the upper surface of the piston;
        a third wall portion formed as a lower circumferential wall extending downward and radially outward from the lower end of the intermediate circumferential wall at an angle c with respect to the upper surface of the piston;
    wherein angles a, b, and c are as follows:
        $a=90°$; $65°<b<75°$; and $40°<c<55°$; and
    a center projection projecting upwardly from a central bottom area of the combustion chamber, the center projection having a top wall and a foot end; and
    a radially outward expanding portion formed at an outer peripheral portion of the combustion chamber between an outer peripheral edge of the top wall of the center projection and the foot of the center projection.

2. The combustion chamber for a direct-injection diesel engine according to claim 1, wherein a center axis of an interior of the combustion chamber is aligned with a center axis of the opening at the upper end.

3. The combustion chamber for a direct-injection diesel engine according to claim 1, wherein a radius R of a round portion at the opening at the upper end of the combustion chamber and a diameter D of the piston satisfy the relationship: $0.04<R/D<0.12$.

4. The combustion chamber for a direct-injection diesel engine according to claim 1, wherein an entire depth H of the combustion chamber and a depth h' from a boundary between the intermediate circumferential wall and the lower circumferential wall to a bottom end of the combustion chamber satisfy the relationship: $0.65<h'/H<0.75$.

5. The combustion chamber for a direct-injection diesel engine according to claim 1, wherein a distance L between straight portions facing each other at the opening at the upper end of the combustion chamber, a maximum diameter d' of the combustion chamber, and a diameter D of the piston satisfy the relationships: $0.4<L/D<0.55$ and $0.05<(d'-L)/D$.

\* \* \* \* \*